United States Patent
Luo et al.

(10) Patent No.: US 11,509,515 B2
(45) Date of Patent: Nov. 22, 2022

(54) SYNCHRONIZATION SIGNAL TRANSMISSION AND DETECTION

(71) Applicant: QUALCOMM Incorporated, San Diego, CA (US)

(72) Inventors: Tao Luo, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/711,713

(22) Filed: Sep. 21, 2017

(65) Prior Publication Data

US 2018/0176067 A1 Jun. 21, 2018

Related U.S. Application Data

(60) Provisional application No. 62/435,577, filed on Dec. 16, 2016.

(51) Int. Cl.
*H04W 56/00* (2009.01)
*H04L 27/26* (2006.01)

(52) U.S. Cl.
CPC ......... *H04L 27/2678* (2013.01); *H04W 56/00* (2013.01)

(58) Field of Classification Search
USPC ........ 370/229, 230, 252, 328, 329, 330, 350
See application file for complete search history.

(56) References Cited

U.S. PATENT DOCUMENTS

| 9,094,146 | B2 | 7/2015 | Lindoff et al. | |
| 10,945,234 | B2* | 3/2021 | Liu | H04W 72/0446 |
| 2010/0130218 | A1* | 5/2010 | Zhang | H04W 48/12 455/450 |
| 2013/0089065 | A1 | 4/2013 | Koorapaty et al. | |
| 2013/0195069 | A1* | 8/2013 | Frederiksen | H04W 48/12 370/330 |
| 2013/0235851 | A1 | 9/2013 | Abu-Surra et al. | |
| 2013/0294333 | A1 | 11/2013 | Chen et al. | |
| 2014/0198772 | A1 | 7/2014 | Paldemair et al. | |
| 2014/0235243 | A1* | 8/2014 | Damnjanovic | H04W 52/0206 455/436 |

(Continued)

FOREIGN PATENT DOCUMENTS

| CN | 102448155 A | 5/2012 |
| CN | 105659675 A | 6/2016 |
| WO | 2016064315 A1 | 4/2016 |

OTHER PUBLICATIONS

Coolpad: "Discussion on the design for synchronization signal", 3GPP TSG RAN WG1 Meeting #87 Reno, USA Nov. 14-18, 2016, R1-1612755, pp. 1-3 (Year: 2016).*

(Continued)

*Primary Examiner* — Nguyen H Ngo
(74) *Attorney, Agent, or Firm* — Holland & Hart LLP/Qualcomm

(57) ABSTRACT

Aspects of the present disclosure provide designs for transmitting and detecting bursts of synchronization signal (SS) blocks. For example, a method for wireless communications by a base station (BS) may include determining a position of a first synchronization signal (SS) block, within a burst of SS blocks and transmitting the burst of SS blocks, in accordance with the determination.

22 Claims, 12 Drawing Sheets

(56) References Cited

U.S. PATENT DOCUMENTS

| | | | |
|---|---|---|---|
| 2014/0314072 A1* | 10/2014 | Awad | H04L 5/001 370/350 |
| 2015/0016337 A1 | 1/2015 | Chung et al. | |
| 2015/0049741 A1* | 2/2015 | Chen | H04W 48/12 370/336 |
| 2015/0050127 A1* | 2/2015 | Peters | F02K 1/80 415/135 |
| 2015/0319802 A1* | 11/2015 | Lindoff | H04W 24/02 455/422.1 |
| 2016/0128008 A1* | 5/2016 | Levy | H04W 24/02 370/350 |
| 2016/0135123 A1* | 5/2016 | Soldati | H04W 52/0206 370/311 |
| 2017/0048812 A1* | 2/2017 | Da | H04W 56/004 |
| 2017/0094624 A1 | 3/2017 | Palachandran et al. | |
| 2017/0181145 A1* | 6/2017 | Fong | H04W 72/042 |
| 2017/0202025 A1* | 7/2017 | Ouchi | H04W 52/346 |
| 2017/0331645 A1* | 11/2017 | Baligh | H04L 5/0023 |
| 2017/0339660 A1* | 11/2017 | Kazmi | H04W 64/003 |
| 2017/0359849 A1* | 12/2017 | Zhang | H04W 72/14 |
| 2018/0007670 A1* | 1/2018 | Bala | H04W 72/04 |
| 2018/0049113 A1* | 2/2018 | Jung | H04L 5/0048 |
| 2018/0063841 A1* | 3/2018 | Song | H04W 72/0453 |
| 2018/0084593 A1* | 3/2018 | Chen | H04L 27/2613 |
| 2018/0115996 A1* | 4/2018 | Si | H04W 74/0808 |
| 2018/0131487 A1* | 5/2018 | Ly | H04L 5/0048 |
| 2018/0139084 A1* | 5/2018 | Jung | H04J 11/0069 |
| 2018/0146439 A1* | 5/2018 | Kim | H04W 52/325 |
| 2018/0167946 A1* | 6/2018 | Si | H04L 5/00 |
| 2018/0278388 A1* | 9/2018 | Liu | H04L 27/2602 |
| 2018/0317212 A1* | 11/2018 | Kazmi | H04W 24/10 |
| 2018/0376440 A1* | 12/2018 | Ko | H04J 11/00 |
| 2019/0007152 A1* | 1/2019 | Yi | H04J 3/1605 |
| 2019/0103931 A1* | 4/2019 | Yi | H04B 7/2656 |
| 2019/0229867 A1* | 7/2019 | Yi | H04L 5/0048 |
| 2019/0230696 A1* | 7/2019 | Kim | H04L 5/00 |
| 2019/0268205 A1* | 8/2019 | Shin | H04L 27/2675 |
| 2019/0268930 A1* | 8/2019 | Rudolf | H04W 72/14 |
| 2021/0058807 A1* | 2/2021 | Cui | H04W 56/001 |

OTHER PUBLICATIONS

International Search Report and Written Opinion—PCT/US2017/065326—ISA/EPO—dated Mar. 26, 2018.
LG Electronics: "Discussion on SS Block and SS Burst", 3GPP TSG RAN WG1 Meeting #87, R1-1611786, Reno, USA, Nov. 14-18, 2016, 3 Pages.
MEDIATEK: "Scope of 5G NR Phase 1", 3GPP TSG RAN#74, Dec. 8, 2016.

* cited by examiner

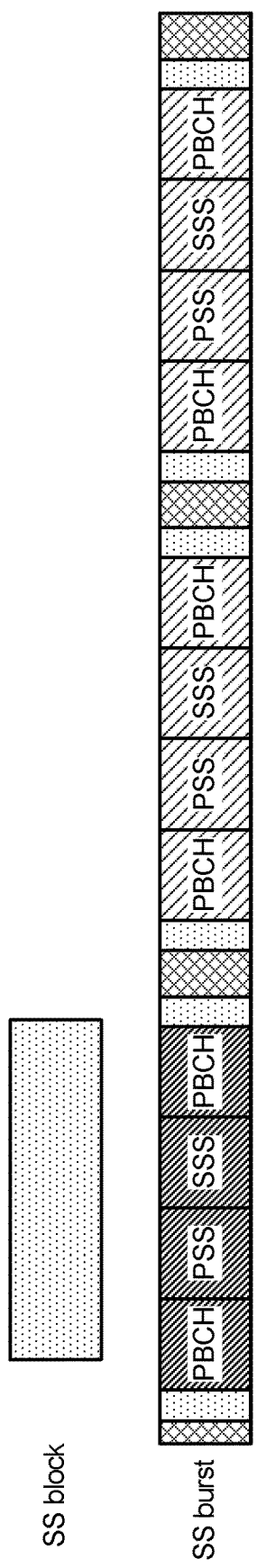
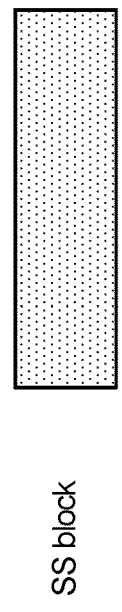
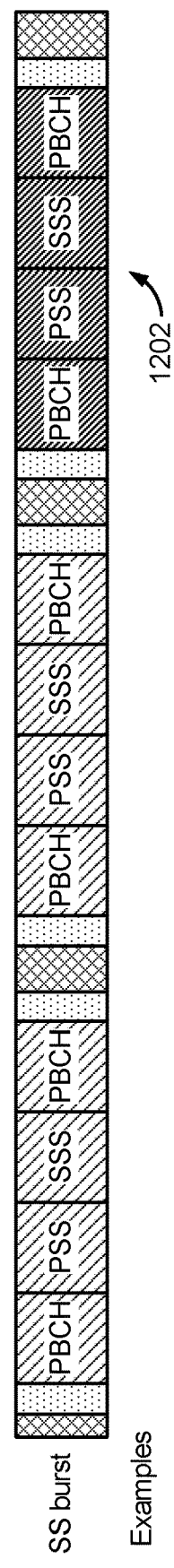
FIG. 11
FIG. 12

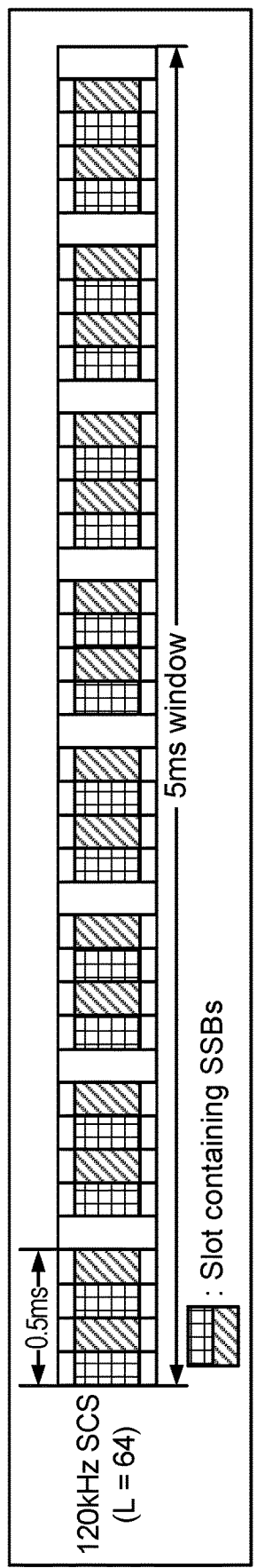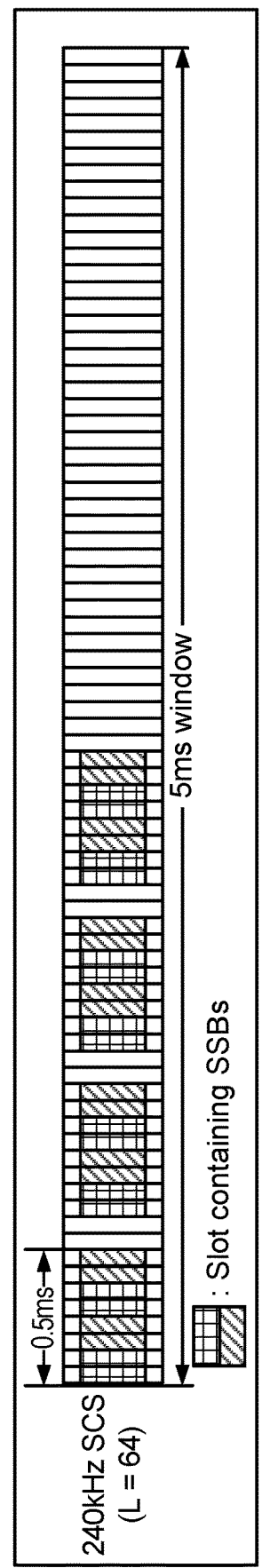
FIG. 15
FIG. 16

SYNCHRONIZATION SIGNAL TRANSMISSION AND DETECTION

CLAIM OF PRIORITY UNDER 35 U.S.C. § 119

The present Application for Patent claims benefit of U.S. Provisional Patent Application Ser. No. 62/435,577, filed Dec. 16, 2016, assigned to the assignee hereof and hereby expressly incorporated by reference herein.

BACKGROUND

Field of the Disclosure

Certain aspects of the present disclosure generally relate to wireless communications and, more particularly, to synchronization signal design, transmission, and detection.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system may simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, monitors, location tags, etc., that may communicate with a base station (BS), another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

Certain aspects of the present disclosure provide a method for wireless communications by a base station. The method generally includes determining a position of a first synchronization signal (SS) block, within a burst of SS blocks, and transmitting the burst of SS blocks, in accordance with the determination.

Certain aspects of the present disclosure provide a method for wireless communications by a user equipment (UE). The method generally includes determining a position of a first synchronization signal (SS) block, within a burst of SS blocks, and processing the burst of SS blocks, in accordance with the determination.

Numerous other aspects are provided including methods, apparatus, systems, computer program products, and processing systems.

BRIEF DESCRIPTION OF THE DRAWINGS

FIGS. 11 and 12 illustrate example bursts of SS blocks with anchor SS blocks, according to certain aspects of the present disclosure.

FIG. 15 illustrates another example of mapping to slots in a half radio frame with 120 kHz SCS, according to certain aspects of the present disclosure.

FIG. 16 illustrates yet another example of mapping to slots in a half radio frame with 240 kHz SCS, according to certain aspects of the present disclosure.

DETAILED DESCRIPTION

Certain aspects of the present disclosure generally relate to design of synchronization signals and transmission thereof that may be used for narrowband internet of things (NB-IoT) operation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Example Wireless Communication System

Figure 1:
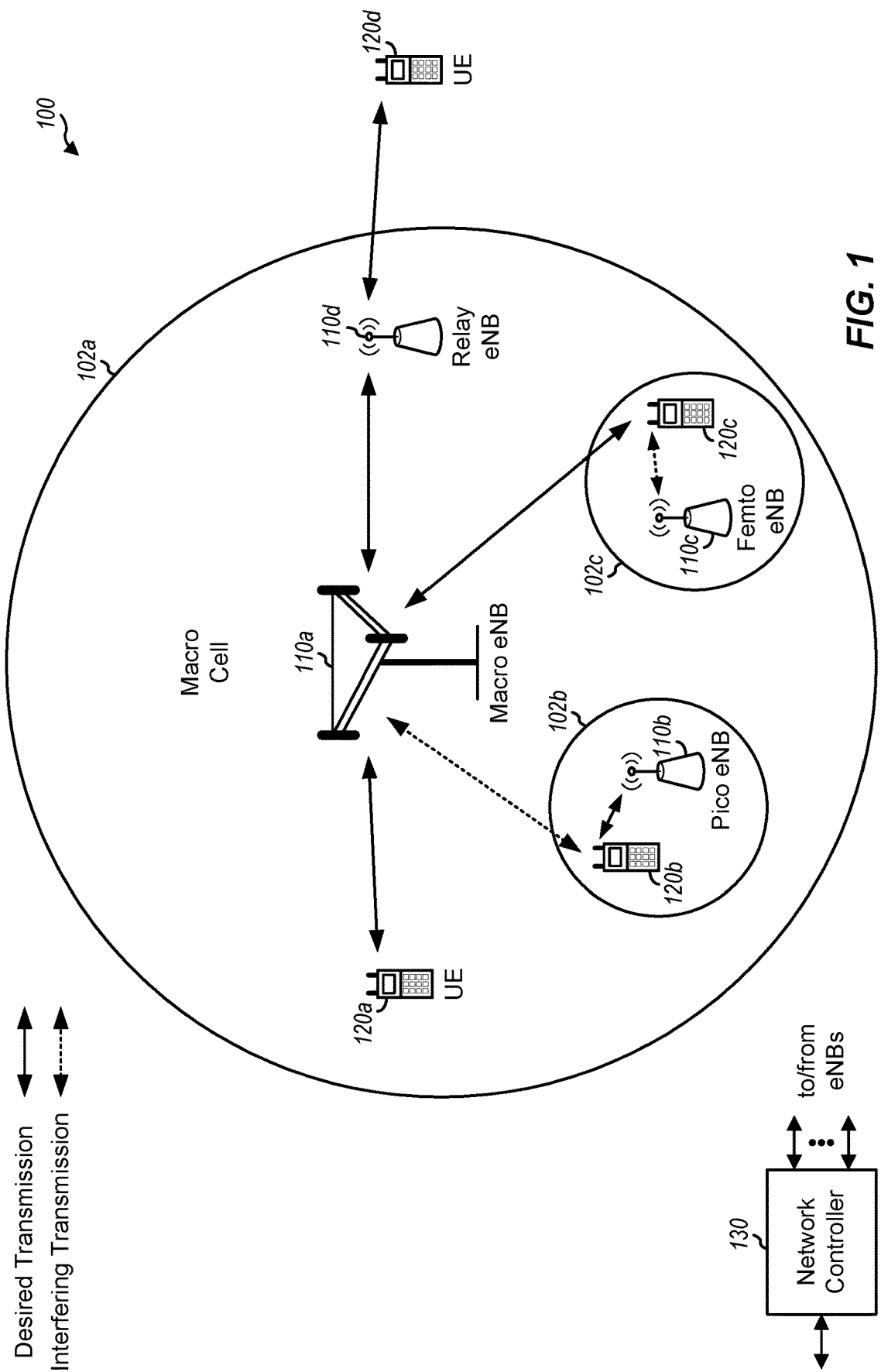
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 communicate on a machine type physical downlink control channel (mPDCCH) using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used. Some examples of UEs may include cellular phones, smart phones, personal digital assistants (PDAs), wireless modems, handheld devices, tablets, laptop computers, netbooks, smartbooks, ultrabooks, wearable devices (e.g., smart glasses, smart bracelets, smart wrist bands, smart rings, smart watches, smart clothing), drones, robots, etc. Some UEs may be considered machine-type communication (MTC) UEs, which may include remote devices, such as sensors, meters, monitors, location tags, drones, robots, etc., that may communicate with a base station, another remote device, or some other entity. Machine type communications (MTC) may refer to communication involving at least one remote device on at least one end of the communication and may include forms of data communication which involve one or more entities that do not necessarily need human interaction.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

According to certain aspects, narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
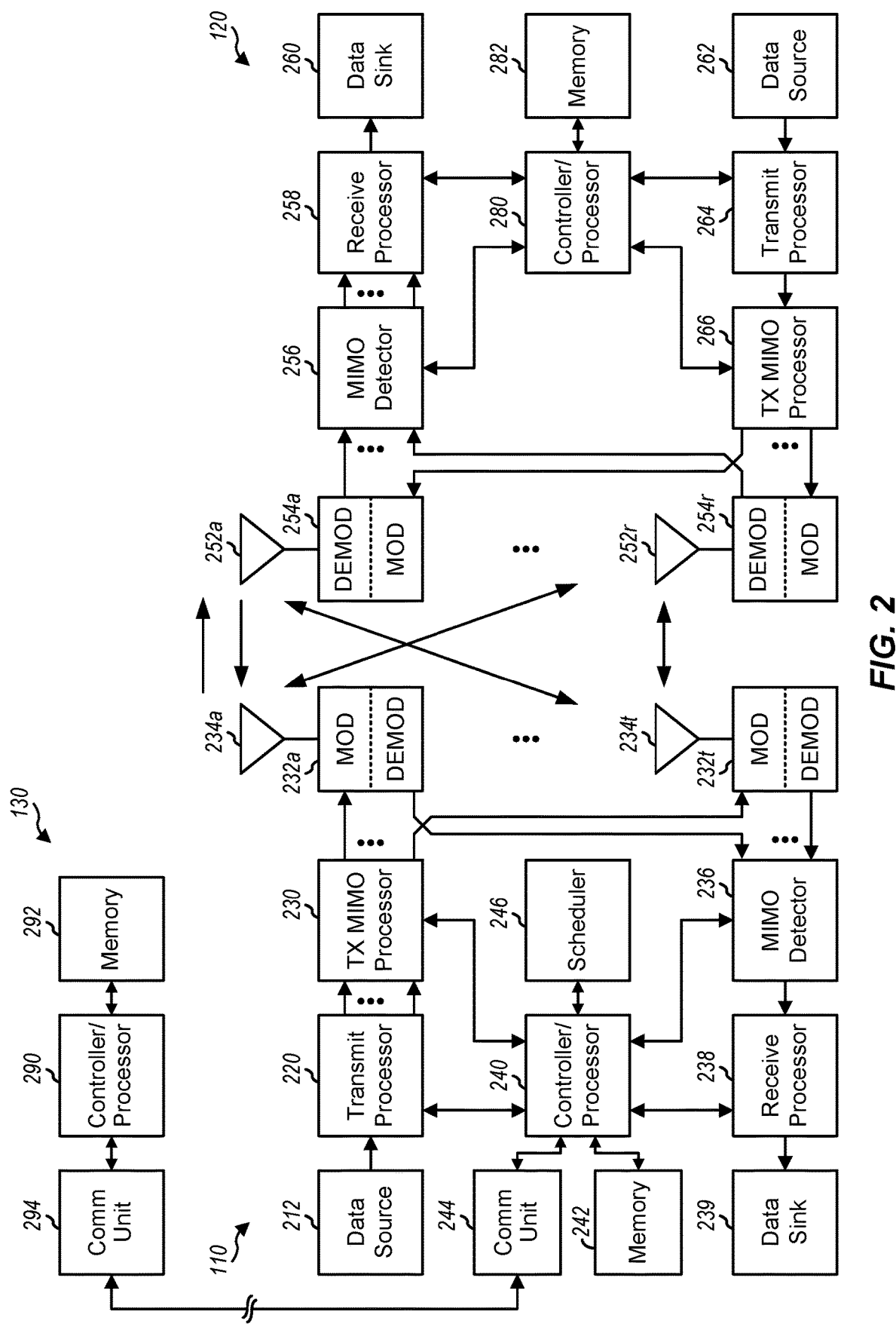
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 280 and/or other processors and modules at UE 120 may perform or direct operations 800 and 1600 shown in FIGS. 8 and 16, and processor 240 and/or other processors and modules at base station 110 may perform or direct operations 900 and 1500 shown in FIGS. 9 and 15. Memories 242 and 282 may store data and program codes for base station 110 and UE 120, respectively. A scheduler 246 may schedule UEs for data transmission on the downlink and/or uplink.

Figure 3:
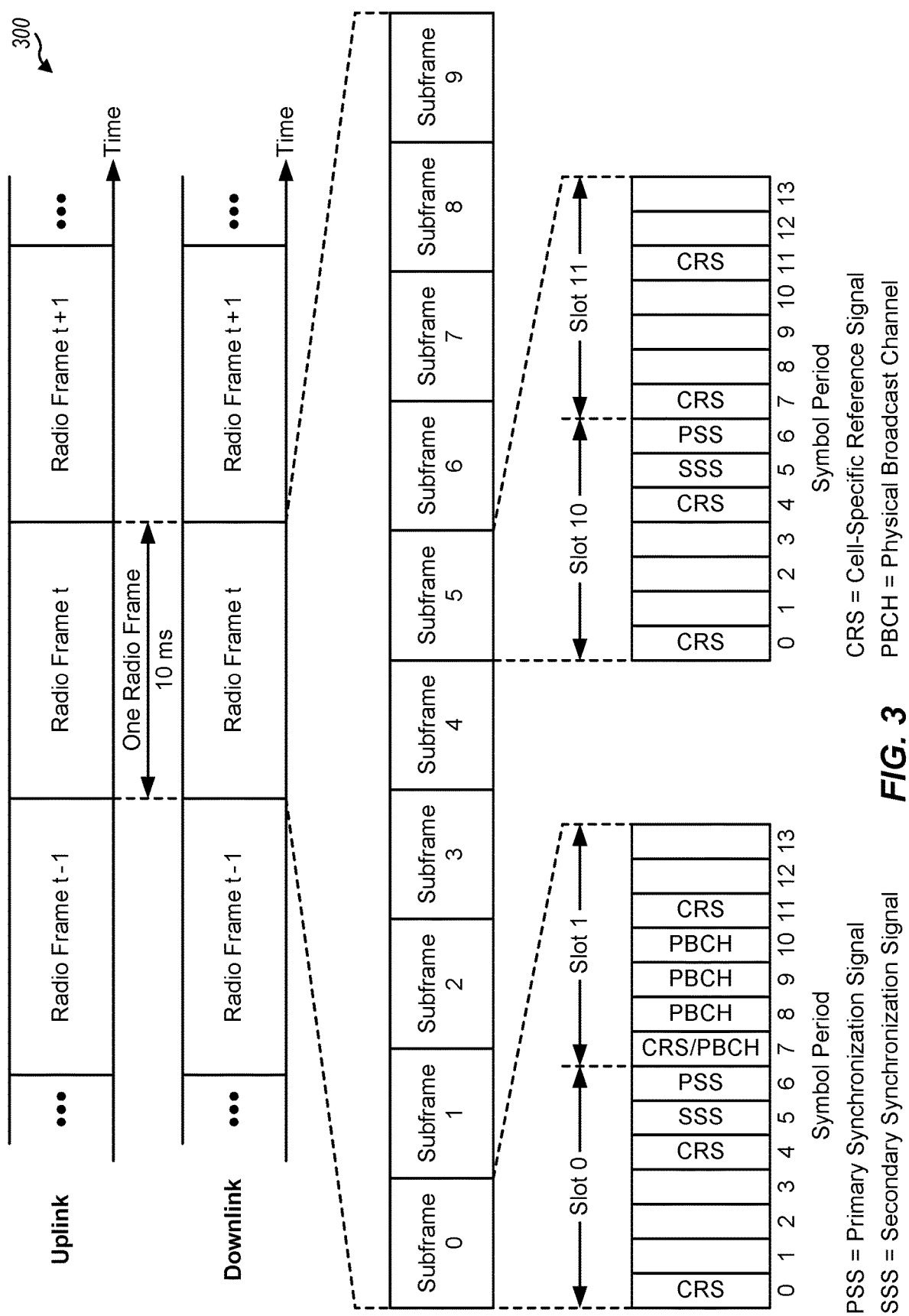
FIG. 3 shows an exemplary frame structure for frequency division duplexing (FDD) in long term evolution (LTE).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Channel quality measurements may be performed by a UE according to a defined schedule, such one based on the DRX cycle of the UE. For example, a UE may attempt to perform measurements for a serving cell at every DRX cycle. The UE may also attempt to perform measurements for non-serving neighboring cells. Measurements for non-serving neighbor cells may be made based on a different schedule than for serving cells and the UE may tune away from the serving cell to measure non-serving cells when the UE is in connected mode.

To facilitate channel quality measurements, an eNB may transmit a cell specific reference signal (CRS) on specific subframes. For example, an eNB may transmit CRS over subframes 0 and 5 for a given frame. A narrowband UE may receive this signal and measure the average power of the received signal, or RSRP. The narrowband UE may also calculate a Receive Signal Strength Indicator (RSSI) based on the total received signal power from all sources. A RSRQ may be also be calculated based on the RSRP and RSSI.

To facilitate measurements, an eNB may provide a measurement configuration to UEs in its coverage area. The measurement configuration may define event triggers for measurement reporting and each event trigger may have associated parameters. When the UE detects a configured measurement event, the UE may respond by sending a measurement report to the eNB with information about the associated measurement objects. A configured measurement event may be, for example, a measured reference signal received power (RSRP) or a measured reference signal received quality (RSRQ) satisfying a threshold. A time-to-trigger (TTT) parameter may be used to define how long a measurement event may persist before the UE sends its measurement report. In this way, the UE may signal changes in its radio conditions to the network.

Figure 4:
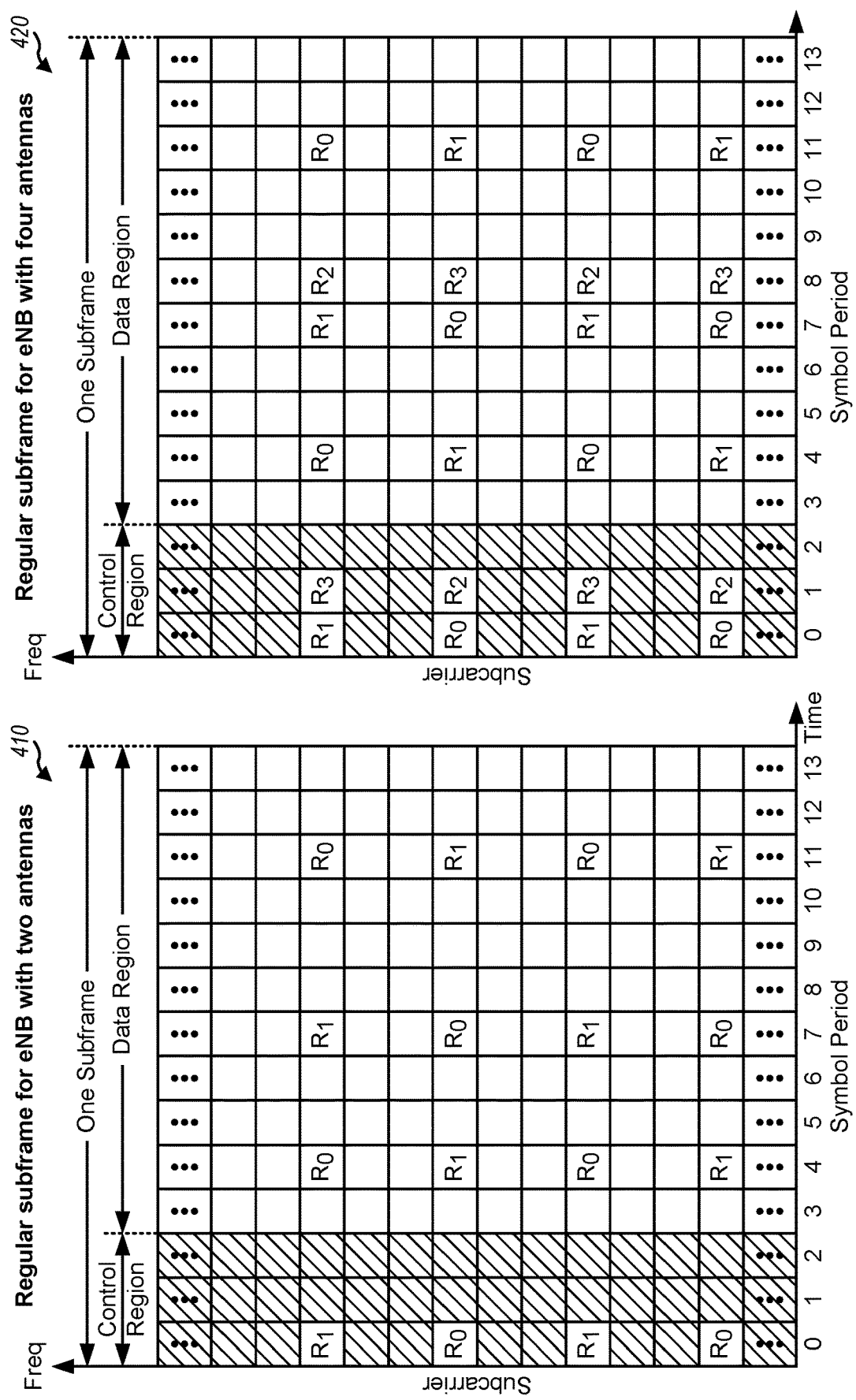
FIG. 4 shows two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

The focus of traditional LTE design is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

Thus, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed for the case where a limited amount of information may be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, narrowband UEs may have a relaxed switching time to transition from transmitting to receiving (or receiving to transmitting). For example, the switching time may be relaxed from 20 μs for regular UEs to 1 ms for narrowband UEs. Release 12 narrowband UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

In some systems, for example, in LTE Rel-13, the narrowband may be limited to a particular narrowband assignment (e.g., of no more than six resource blocks (RBs)) within the available system bandwidth. However, the narrowband may be able to re-tune (e.g., operate and/or camp) to different narrowband regions within the available system bandwidth of the LTE system, for example, in order to co-exist within the LTE system As another example of coexistence within the LTE system, narrowband UEs may be able to receive (with repetition) legacy physical broadcast channel (PBCH) (e.g., the LTE physical channel that, in general, carries parameters that may be used for initial access to the cell, such as the MIB) and support one or more legacy physical random access channel (PRACH) formats. For example, the narrowband UEs may be able to receive the legacy PBCH with one or more additional repetitions of the PBCH across multiple subframes. As another example, the narrowband UEs may be able to transmit one or more repetitions of PRACH (e.g., with one or more PRACH formats supported) to an eNB in the LTE system. The PRACH may be used to identify the narrowband UE. Also, the number of repeated PRACH attempts may be configured by the eNB.

The narrowband UE may also be a link budget limited device and may operate in different modes of operation (e.g. entailing different amounts of repeated messages transmitted to the narrowband UE) based on its link budget limitation. For example, in some cases, the narrowband UE may operate in a normal coverage mode in which there is little to no repetition (i.e., the amount of repetition needed for the UE to successfully receive a message may be low or repetition may not even be needed). Alternatively, in some cases, the narrowband UE may operate in a coverage enhancement (CE) mode in which there may be high amounts of repetition. For example, for a 328 bit payload, a narrowband UE in CE mode may use 150 or more repetitions of the payload in order to successfully receive the payload.

In some cases, for example, for LTE Rel-13, the narrowband UE may have limited capabilities with respect to its reception of broadcast and unicast transmissions. For example, the maximum transport block (TB) size for a broadcast transmission received by the narrowband UE may be limited to 1000 bits. Additionally, in some cases, the narrowband UE may not be able to receive more than one unicast TB in a subframe. In some cases (e.g., for both the CE mode and normal mode described above), the narrowband UE may not be able to receive more than one broadcast TB in a subframe. Further, in some cases, the narrowband UE may not be able to receive both a unicast TB and a broadcast TB in a subframe.

Narrowband UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-narrowband UEs. For example, as compared to conventional paging messages used in LTE, narrowband UEs may able to monitor and/or receive paging messages that non-narrowband UEs may not able to monitor and/or receive. Similarly, as compared to conventional random access response (RAR) messages used in a conventional random access procedure, narrowband UEs may be able to receive RAR messages that also may not be able to be received by non-narrowband UEs. The new paging and RAR messages associated with narrowband UEs may also be repeated one or more times (e.g., "bundled"). In addition, different numbers of repetitions (e.g., different bundling sizes) for the new messages may be supported.

According to certain aspects, multiple narrowband regions, with each narrowband region spanning a bandwidth that is no greater than a total of 6 RBs, may be supported by narrowband UE and/or narrowband operation. In some cases, each narrowband UE in narrowband operation may operate within one narrowband region (e.g., at 1.4 MHz or 6 RBs) at a time. However, narrowband UEs in narrowband operation, at any given time, may re-tune to other narrowband regions in the wider system bandwidth. In some examples, multiple narrowband UEs may be served by the same narrowband region. In other examples, multiple narrowband UEs may be served by different narrowband regions (e.g., with each narrowband region spanning 6 RBs). In yet other examples, different combinations of narrowband UEs may be served by one or more same narrowband regions and/or one or more different narrowband regions.

Some systems, for example, in LTE Rel-13, introduce coverage enhancements and support for narrowband UEs, as well as other UEs. As used herein, the term coverage enhancement generally refers to any type of mechanism that extends the coverage range of a device (such as a narrowband device) within a network. One approach for coverage enhancement (CE) is bundling which refers to transmitting the same data multiple times (e.g., across multiple subframes or, as will be described in greater detail below, across multiple symbols within a same subframe).

In certain systems, narrowband UEs may support narrowband operation while operating in a wider system bandwidth. For example, a narrowband UE may transmit and receive in a narrowband region of a system bandwidth. As noted above, the narrowband region may span 6 resource blocks (RBs).

Certain systems may provide narrowband UEs with coverage enhancements of up to 15 dB, which maps to 155.7 dB maximum coupling loss between the UE and an eNB. Accordingly, narrowband UEs and eNB may perform measurements at low SNRs (e.g., −15 dB to −20 dB). In some systems, coverage enhancements may include channel bundling, wherein messages associated with narrowband UEs may be repeated (e.g., bundled) one or more times.

Certain devices may be able to communicate both with legacy type communications and non-legacy type communications. For example, some devices may be able to communicating in both narrowband regions (of overall system bandwidth) as well as wider band regions. While the examples above refer to low cost or MTC devices that communicate via narrowband regions, other (non-low-cost/non-MTC) types of devices may also communicate vie narrowband regions, for example, taking advantage of frequency selectivity and directional transmissions.

Devices may communicate using relative narrowband regions of system bandwidth, such as narrowband internet of things (NB-IoT) devices. To reduce the complexity of UEs, NB-IoT may allow for deployments utilizing one Physical Resource Block (PRB) (180 kHz+20 kHz guard band). NB-IoT deployments (e.g., utilizing 1 RB) may utilize higher layer components of LTE and hardware to allow for reduced fragmentation and cross compatibility with, for example, NB-LTE and eMTC (enhanced MTC).

Figure 5:
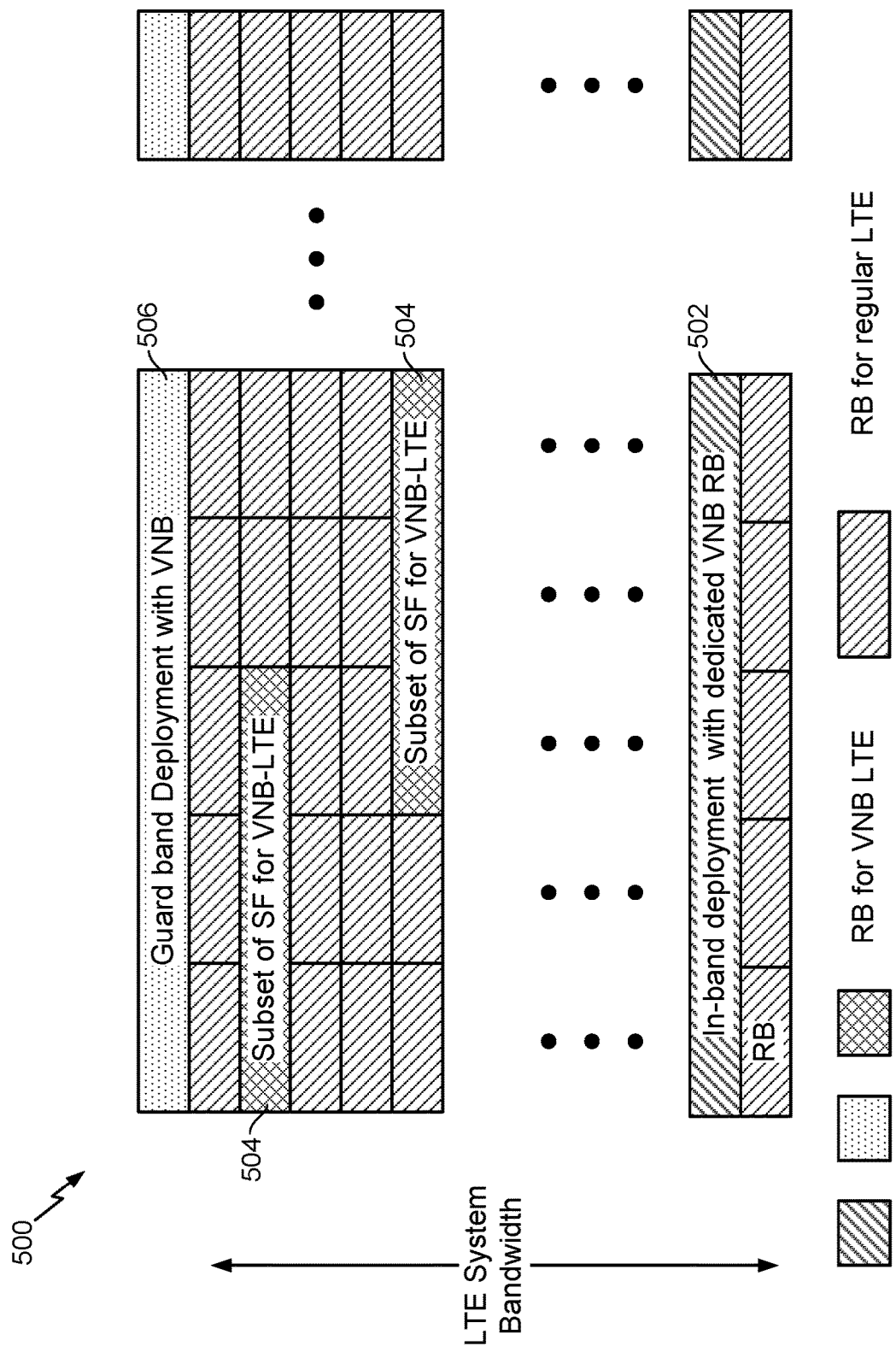
FIG. 5 illustrates an example deployment of NB-IoT, according to certain aspects of the present disclosure.

FIG. 5 illustrates an example deployment 500 of NB-IoT, according to certain aspects of the present disclosure. According to certain aspects, NB-IoT may be deployed in three broad configurations. In certain deployments, NB-IoT may be deployed in-band and coexist with legacy GSM/WCDMA/LTE system(s) deployed in the same frequency band. Wideband LTE channel, for example, may be deployed in various bandwidths between 1.4 MHz to 20 MHz, and there may be a dedicated RB 502 available for use by NB-IoT, or the RBs allocated for NB-IoT may be dynamically allocated 504. In an in-band deployment, one resource block (RB), or 200 kHz, of a wideband LTE channel may be used for NB-IoT. LTE implementations may include unused portions of radio spectrum between carriers to guard against interference between adjacent carriers. In some deployments, NB-IoT may be deployed in a guard band 506 of the wideband LTE channel. In other deployments, NB-IoT may be deployed standalone (not shown). In a standalone deployment, one 200 MHz carrier may be utilized to carry NB-IoT traffic and GSM spectrum may be reused.

Deployments of NB-IoT, may include synchronization signals such as PSS for frequency and timing synchronization and SSS to convey system information. According certain aspects of the present disclosure, synchronization signals of NB-IoT operations occupy narrow channel bandwidths and may coexist with legacy GSM/WCDMA/LTE system(s) deployed in the same frequency band. NB-IoT operations may include PSS/SSS timing boundaries. In certain aspects, these timing boundaries may be extended as compared to the existing PSS/SSS frame boundaries in legacy LTE systems (e.g., 10 ms) to, for example, 40 ms. Based on the timing boundary, a UE is able to receive a PBCH transmission, which may be transmitted in subframe 0 of a radio frame.

Example Synchronization Signal Transmission and Detection

In some cases, synchronization signals, such as PSS, SSS and/or PBCH may be transmitted within a structure referred to as an "SS block." An SS block may be composed of one or more SSs in various arrangements and, in some cases, other signals may be multiplexed within an SS block.

In some cases, a "burst" of one or multiple SS block may be sent. An SS burst may be of various durations and SS blocks may or may not be consecutive within a burst and may or may not be the same. A group of SS bursts may be sent as an "SS burst set." Periodicity and the number of 'SS bursts' within an SS burst set may also vary, but generally, the number of SS bursts within a SS burst set will be finite. Transmission instances of 'SS burst set' may be periodic/aperiodic transmission of SS burst sets. The maximum number of SS-blocks within an SS burst set, L, may be different for different frequency ranges. For example, for frequency ranges up to 3 GHz, L may be 4. For frequency range from 3 GHz to 6 GHz, L may be 8. Further, for frequency range from 6 GHz to 52.6 GHz, L may be 64.

Figure 6:
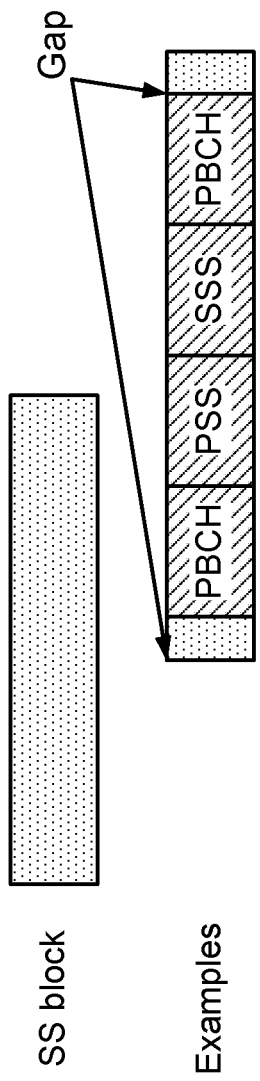
FIG. 6 illustrates an example block of synchronization signals, according to certain aspects.

As noted above, multiple signals may be multiplexed within a SS block. Multiplexing among signals may be TDM, FDM or a mix of TDM/FDM. The example shown in FIG. 6 shows TDM multiplexing among PSS/SSS/PBCH. It may be noted that additional signals may be added in a SS block.

As illustrated in FIG. 6, a gap (in time) may be used in a SS block at the beginning and/or at the end of the SS block. Such gaps may be used for downlink or uplink communications. In some design options, however, there may be no gaps. In accordance with one or more cases, the gap may be a multiple of an SS block length. In other cases, the gap may be a function of the band, or the gap may be an integer number of SS block duration.

Figure 7:
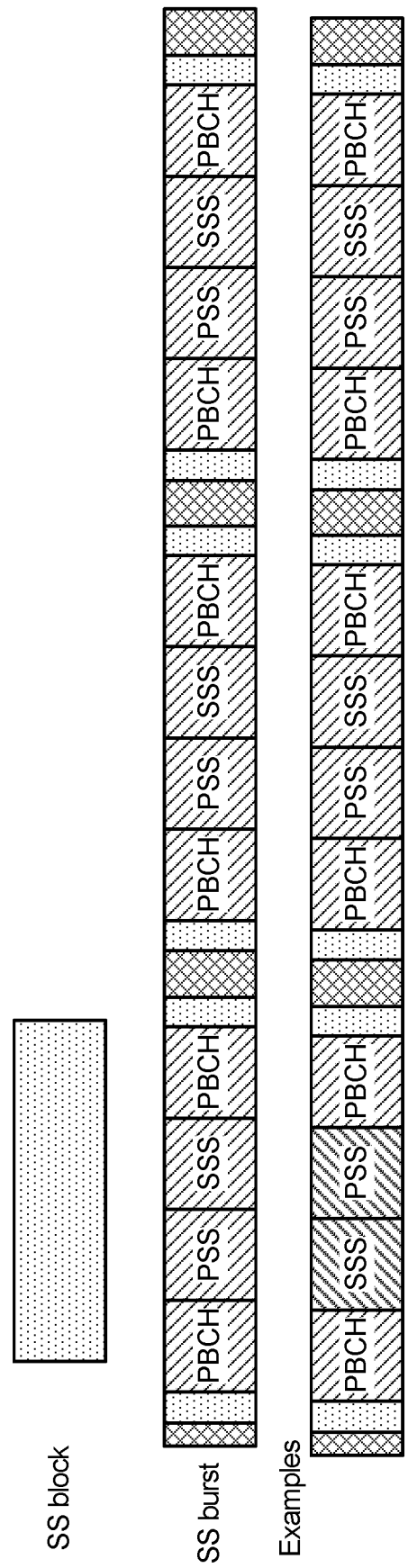
FIG. 7 illustrates an example burst of synchronization signal (SS) blocks, according to certain aspects.

As shown in FIG. 7, multiple SS blocks may be multiplexed within an SS burst. A gap may be used in an SS burst between SS blocks. This gap may be the same gap for a SS block. It may be noted that signals may be permuted within an SS block, such that different SS blocks in a SS burst may use the same signal but in different orders. In one example, one burst may include two SS blocks that are separated by two symbols in a 15 kHz numerology.

Due to the above described options, before detecting synchronization signals, a UE may not have knowledge of the exact structure of an SS block, SS burst, or SS burst set. Aspects of the present disclosure provide SS block and burst designs that may help a UE determine how to identify SS blocks with an SS burst.

Figure 8:
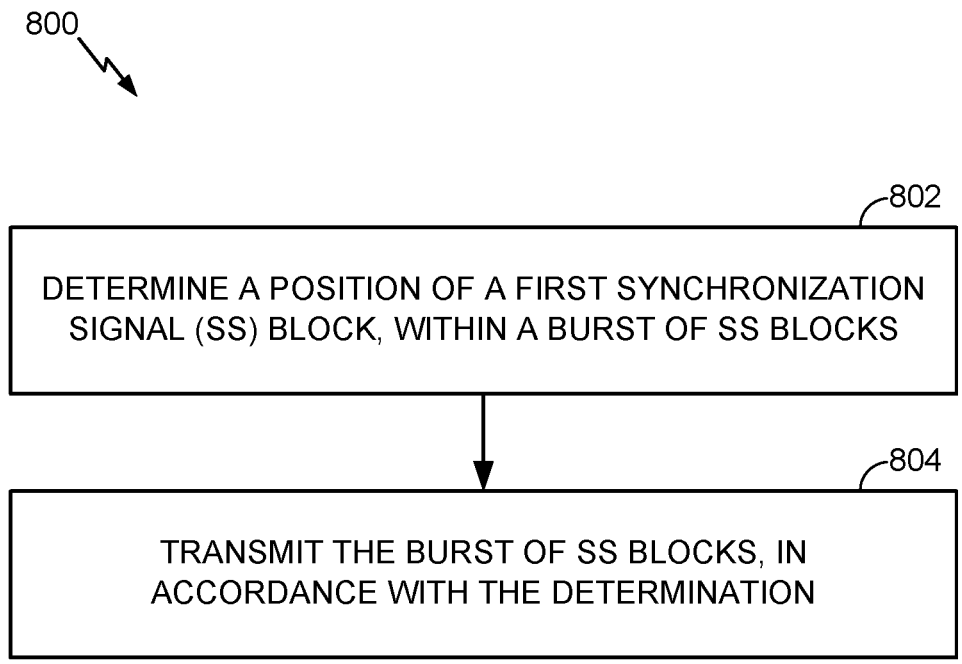
FIG. 8 illustrates example operations for transmitting a burst of SS blocks, in accordance with certain aspects of the present disclosure.

FIG. 8 illustrates example operations 800 for wireless communications by a base station, for transmitting synchronization signals (SS) in accordance with certain aspects of the present disclosure. Operations 800 begin, at 802, by determining a position of a first synchronization signal (SS) block, within a burst of SS blocks, relative to a least a second SS block in the burst. At 804, the BS transmits the burst of SS blocks, in accordance with the determination.

Figure 9:
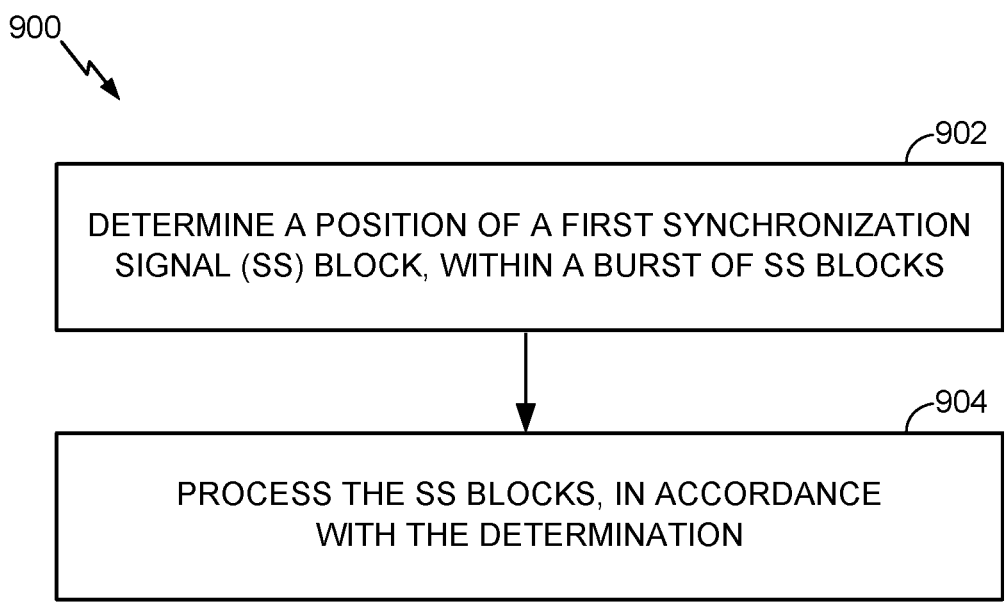
FIG. 9 illustrates example operations for processing a burst of SS blocks, in accordance with certain aspects of the present disclosure.

FIG. 9 illustrates example operations 900 for wireless communications by a UE, for processing synchronization signals (SS), sent in accordance with operations 800 described above. Operations 900 begin, at 902, by determining a position of a first synchronization signal (SS)

block, within a burst of SS blocks, relative to a least a second SS block in the burst. At 904, the UE processes the burst of SS blocks, in accordance with the determination.

Figure 10:
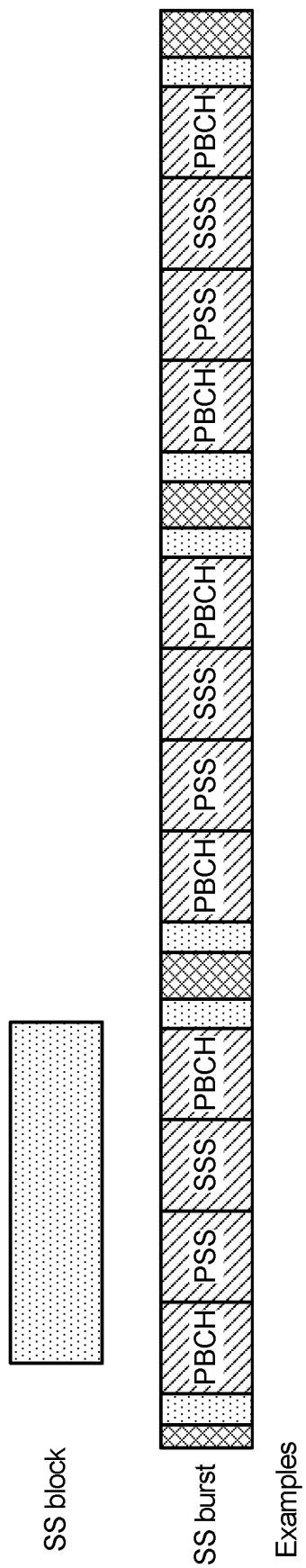
FIG. 10 illustrates an example burst of SS blocks each separated by a gap, according to certain aspects of the present disclosure.
Figure 14:
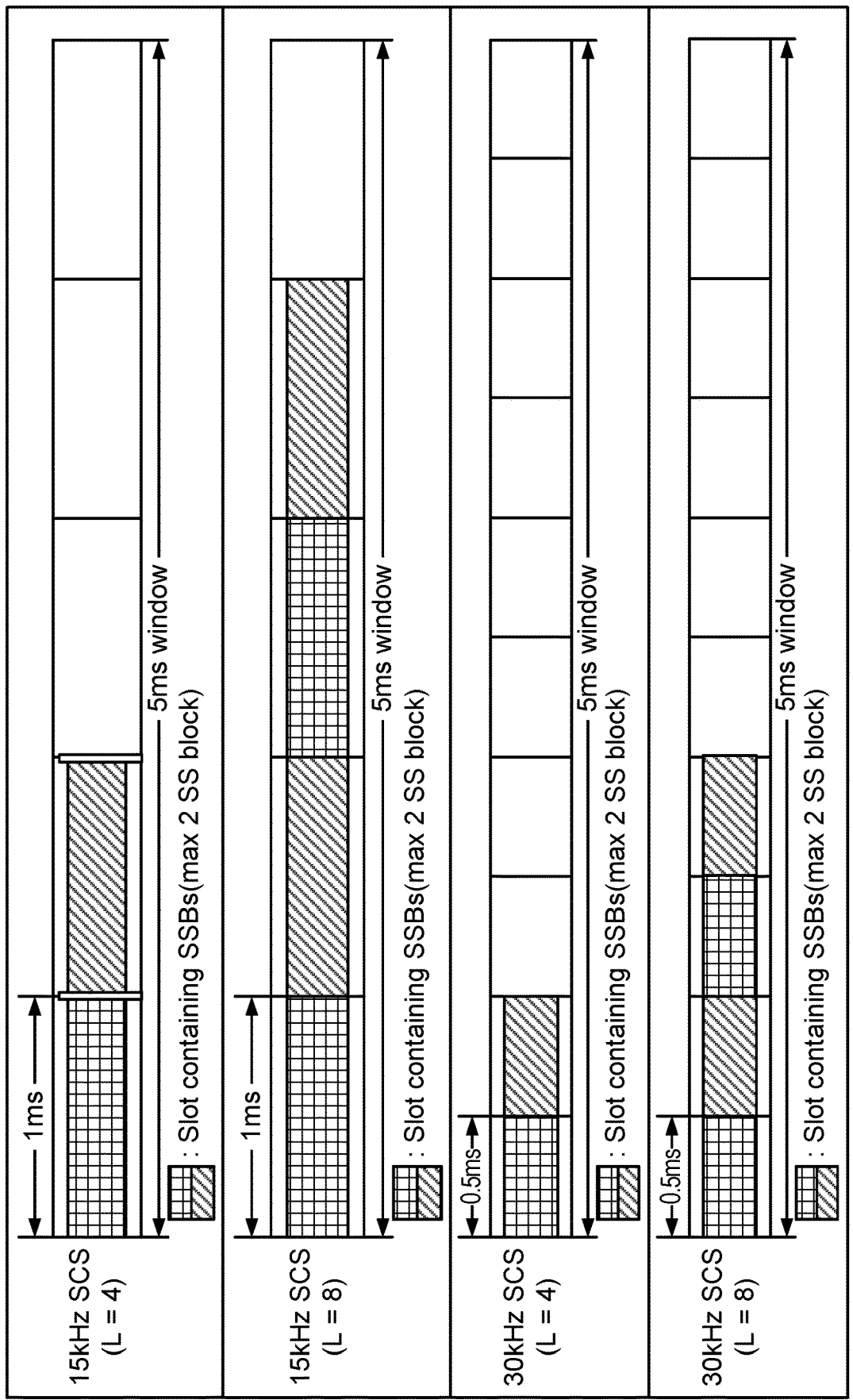
FIG. 14 illustrates examples of mapping to slots in a half radio frame, according to certain aspects of the present disclosure.

In some cases, relative positions of SS blocks within a burst may be determined by maintaining a gap between SS blocks within a SS burst (that has the same duration), as shown in FIG. 10. In one or more cases the gap may be fixed within a burst, but may vary based on a variety of parameters such as, but not limited to, a frequency, a carrier, a subcarrier spacing, and/or an SS duration. For example, as shown in FIGS. 14, 15, and 16, a number of different subcarrier spacing and corresponding slot mappings may be provided in accordance with one or more aspects as disclosed herein. Particularly, FIGS. 14, 15, and 16 show examples of mapping slots in a half radio frame with 15 kHz, 30 kHz, 120 kHz, and/or 240 kHz subcarrier spacing (SCS).

Specifically, FIG. 14 illustrates examples of mapping to slots in a half radio frame with subcarrier spacing (SCS) of 15 kHz or 30 kHz, according to certain aspects of the present disclosure. In the case where 15 kHz SCS is provided and L=4, at least one slot gap may be located between sets of two consecutive slots each containing an SS block (SSB). The at least one slot gap may be 1 ms in length as shown in the first row of FIG. 14. In the case where 15 kHz SCS is provide and L=8, SSBs may be allocated in four slots with the remaining slot being a slot gap. The one slot gap may be 1 ms in length as shown in the second row of FIG. 14. In the cases where 30 kHz SCS is provided (for both L=4 and L=8), at least one slot gap may be located between sets of consecutive slots that contain SSBs. The at least one slot gap may be at least 0.5 ms in length as shown in the third and fourth rows of FIG. 14

Turning now to FIG. 15, for cases where 120 kHz SCS is provided, four SSBs may be allocated in four consecutive slots, and at least one slot gap may be provided between each set of consecutive slots having SSBs. Each of the eight slot gaps may each be ⅛ ms as shown. In another example, as shown in FIG. 16, for cases where 240 kHz SCS is provided, eight SSBs may be allocated in eight consecutive slots. Additionally, there may be provided at least a two consecutive slot gaps between each set of consecutive slots having SSBs. Each of the individual slot gaps may each be 1/16 ms as shown.

In some cases, the exact gap duration may be linked to a reference numerology. For example, the gap duration may correspond to an integer number of symbols in a reference numerology (e.g., with a numerology defining a cyclic prefix length, subcarrier spacing, and the like). For example, normal CP, 15 kHz tone spacing and 1 ms duration, may be the reference numerology. Further, in one or more cases, examples may include applying a gap duration to a 30 kHz pattern, 120 kHz, and/or 240 kHz numerology. In some cases, the gap duration may be band specific or carrier frequency specific while the different numerology may be deployed on the specific band or carrier frequency. For example, on a specific band or carrier frequency, a network may deploy a numerology with either 30 kHz subcarrier spacing, 60 kHz subcarrier spacing, 120 kHz subcarrier spacing, or 240 kHz subcarrier spacing, however, the gap duration between SS blocks within an SS burst may stay fixed and not be dependent on the deployed numerology. Such a design may facilitate UE acquisition, as the UE is not aware of the deployed numerology until the UE acquires the system.

In accordance with one or more cases, for a 30 kHz subcarrier spacing case, a second SS block mapping pattern may include mapping two SS block candidate locations to a slot with 14 symbols. The first candidate location may be mapped at symbols 2-5 while the second candidate location may be mapped at symbols 8-11 in this example. In other cases, other SS block mapping patterns may be used. For example, one may decide on a SS block mapping pattern for each frequency band.

In some cases, relative position of SS blocks within a burst may be determined based on a reference or "anchor" SS block, as shown in FIG. 11. One of the SS block in an SS burst may be identified by a distinctive feature, such as at least some different sequence/signal (special signal/sequence) different from the rest SS blocks in the same SS burst. In some cases, the distinctive feature of the anchor SS block may include a PSS sequence, a SSS sequence, and/or an order of SS signals that is different from other SS blocks in the burst. Further, the relative position may be determined based on at least one of a symbol index, slot numbers, subframe number, or radio frames number identified based on the anchor SS block. In one or more cases, the determination may be based on a pattern where one or more non-anchor SS blocks in the burst are not transmitted.

As illustrated in FIG. 11, the first SS block 1102 in a SS burst has some or partial special signal to be different from the rest SS blocks in a SS burst. A PSS sequence in the first SS block may have a different sequence from the rest SS blocks within a burst.

As illustrated in FIG. 12, in some cases, the last SS block 1202 in a SS burst has some or partial special signal to be different from the rest SS blocks in a SS burst. in this case, the PSS sequence in the first SS block has a different sequence from the rest SS blocks within a burst.

Figure 13:
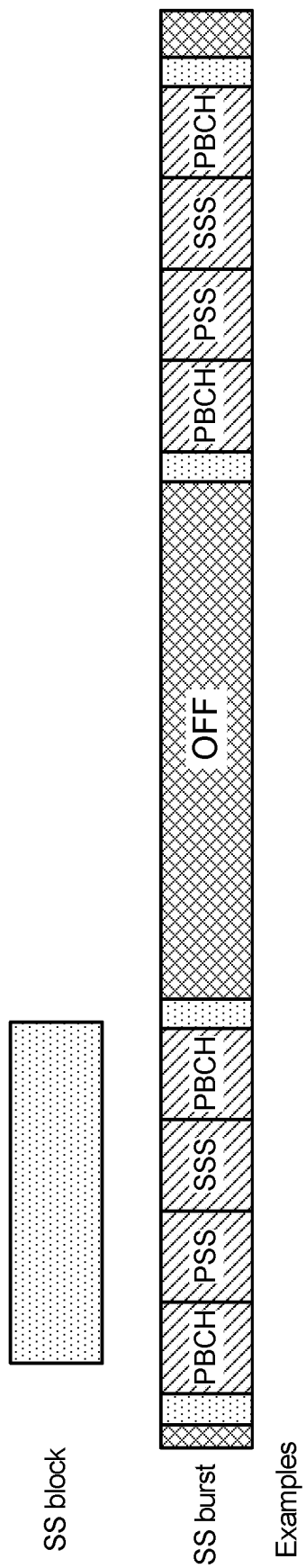
FIG. 13 illustrates an example burst of SS blocks with one or more SS blocks gated off, according to certain aspects of the present disclosure.

As illustrated in FIG. 13, in some cases, some (one or more) of the SS blocks in a SS burst may be gated off. This approach may be used by eNB for power saving purpose. In the example shown in FIG. 13, the middle SS block is turned off in a SS burst. In some cases, certain fixed locations of SS block may not be gated off, for example, the SS block carries the special signal/sequence (e.g., indicating an anchor SS block).

When an anchor SS block is used, a receiver may first try to detect the special signal. Using this special signal, the receiver may identify the potential structure of SS burst (limiting a number of blind decodes). For example, a special signal may be placed in the first block of SS burst. In this case, the receiver may identify the starting point of SS burst, for example, as a symbol index and/or slot numbers/subframe numbers/radio frames number, of a previous or subsequent SS block, may be identified. After the locations of the SS blocks (or other bursts) are identified, the receiver may try to detect the rest of the signals in a burst (or other bursts).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, flash memory, phase change memory, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
    determining positions, in time, of multiple synchronization signal (SS) blocks, within a burst, based at least in part on a subcarrier spacing among a plurality of subcarrier spacings; and
    processing one or more of the multiple SS blocks in the burst, in accordance with the determination, wherein:
        symbol indexes indicate the positions of the multiple SS blocks within the burst;
        an integer number of symbols between at least a first SS block within the burst and a second SS block within the burst depends on a carrier frequency on which the subcarrier spacing is deployed; and
        a symbol index of at least the second SS block of the multiple SS blocks within the burst depends, at least in part, on the integer number of symbols that depends on the carrier frequency.

2. The method of claim 1, wherein the positions of the multiple SS blocks within the burst of SS blocks depend on the carrier frequency.

3. The method of claim 1, further comprising:
    detecting an anchor synchronization signal (SS) block with a distinctive feature, wherein the distinctive feature comprises an order of SS signals that is different from other SS blocks within the burst of SS blocks;
    determining a position of the first SS block, within the burst of SS blocks, based on the detection of the anchor SS block with the distinctive feature; and
    wherein processing the burst of SS blocks comprises processing the burst of SS blocks, in accordance with the determination of the position of the first SS block.

4. The method of claim 3, wherein the anchor SS block is the first SS block in the burst.

5. The method of claim 3, wherein the position of the first SS block is determined based on at least one of a symbol index, slot numbers, subframe number, or radio frames number identified based on the anchor SS block.

6. The method of claim 3, wherein the determination of the position of the first SS block is based on a pattern where one or more non-anchor SS blocks in the burst are not transmitted.

7. The method of claim 6, wherein anchor SS blocks are transmitted each burst.

8. The method of claim 1, wherein the burst comprises the multiple SS blocks in a half radio frame.

9. The method of claim 1, wherein the positions of the multiple SS blocks in the burst are arranged in a symbol pattern associated with the subcarrier spacing.

10. The method of claim 1, wherein a maximum number of SS blocks in the burst depends on the carrier frequency.

11. The method of claim 10, wherein:
the maximum number of SS blocks is four if the carrier frequency is less than 3 GHz, the maximum number of SS blocks is eight if the carrier frequency is between 3 GHz and 6 GHz, and the maximum number of SS blocks is sixty four if the carrier frequency is between 6 GHz and 52.6 GHz.

12. The method of claim 1,
wherein a set of SS blocks, of the multiple SS blocks in the burst, are not transmitted in accordance with a pattern, wherein processing the one or more SS blocks in the burst is in accordance with the set of SS blocks that are not transmitted.

13. An apparatus for wireless communications by a user equipment (UE), comprising:
means for determining positions, in time, of multiple synchronization signal (SS) blocks, within a burst, based at least in part on a subcarrier spacing among a plurality of subcarrier spacings; and
means for processing one or more of the multiple SS blocks in the burst, in accordance with the determination, wherein:
symbol indexes indicate the positions of the multiple SS blocks within the burst;
an integer number of symbols between at least a first SS block within the burst and a second SS block within the burst depends on a carrier frequency on which the subcarrier spacing is deployed; and
a symbol index of at least the second SS block of the multiple SS blocks within the burst depends, at least in part, on the integer number of symbols that depends on the carrier frequency.

14. A non-transitory computer readable medium for wireless communications by a user equipment (UE) having instructions stored thereon for:
determining positions, in time, of multiple synchronization signal (SS) blocks, within a burst, based at least in part on a subcarrier spacing among a plurality of subcarrier spacings; and
processing one or more of the multiple SS blocks in the burst, in accordance with the determination, wherein:
symbol indexes indicate the positions of the multiple SS blocks within the burst;
an integer number of symbols between at least a first SS block within the burst and a second SS block within the burst depends on a carrier frequency on which the subcarrier spacing is deployed; and
a symbol index of at least the second SS block of the multiple SS blocks within the burst depends, at least in part, on the integer number of symbols that depends on the carrier frequency.

15. An apparatus for wireless communications by a user equipment (UE), comprising:
at least one processor configured to:
determine positions, in time, of multiple synchronization signal (SS) blocks, within a burst, based at least in part on a subcarrier spacing among a plurality of subcarrier spacings; and
process one or more of the multiple SS blocks in the burst, in accordance with the determination, wherein:
symbol indexes indicate the positions of the multiple SS blocks within the burst;
an integer number of symbols between at least a first SS block within the burst and a second SS block within the burst depends on a carrier frequency on which the subcarrier spacing is deployed; and
a symbol index of at least the second SS block of the multiple SS blocks within the burst depends, at least in part, on the integer number of symbols that depends on the carrier frequency; and
a memory coupled to the at least one processor.

16. The apparatus of claim 15, wherein the positions of the multiple SS blocks within the burst of SS blocks depend on the carrier frequency.

17. The apparatus of claim 15, wherein the at least one processor is further configured to:
detect an anchor synchronization signal (SS) block with a distinctive feature, wherein the distinctive feature comprises an order of SS signals that is different from other SS blocks within the burst of SS blocks;
determine a position of the first SS block, within the burst of SS blocks, based on the detection of the anchor SS block with the distinctive feature; and
process the burst of SS blocks, in accordance with the determination of the position of the first SS block.

18. The apparatus of claim 17, wherein the anchor SS block is the first SS block in the burst.

19. The apparatus of claim 17, wherein the position is determined based on at least one of a symbol index, slot numbers, subframe number, or radio frames number identified based on the anchor SS block.

20. The apparatus of claim 17, wherein the determination of the position of the first SS block is based on a pattern where one or more non-anchor SS blocks in the burst are not transmitted.

21. The apparatus of claim 20, wherein anchor SS blocks are transmitted each burst.

22. The apparatus of claim 15,
wherein a set of SS blocks, of the multiple SS blocks in the burst, are not transmitted in accordance with a pattern, wherein processing the one or more SS blocks in the burst is in accordance with the set of SS blocks that are not transmitted.

* * * * *